J. M. AYALA.
BREAD SLICING MACHINE.
APPLICATION FILED MAR. 23, 1921.
1,418,511.
Patented June 6, 1922.
2 SHEETS—SHEET 1.
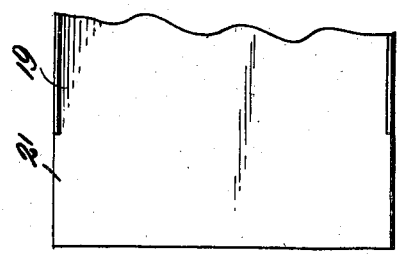
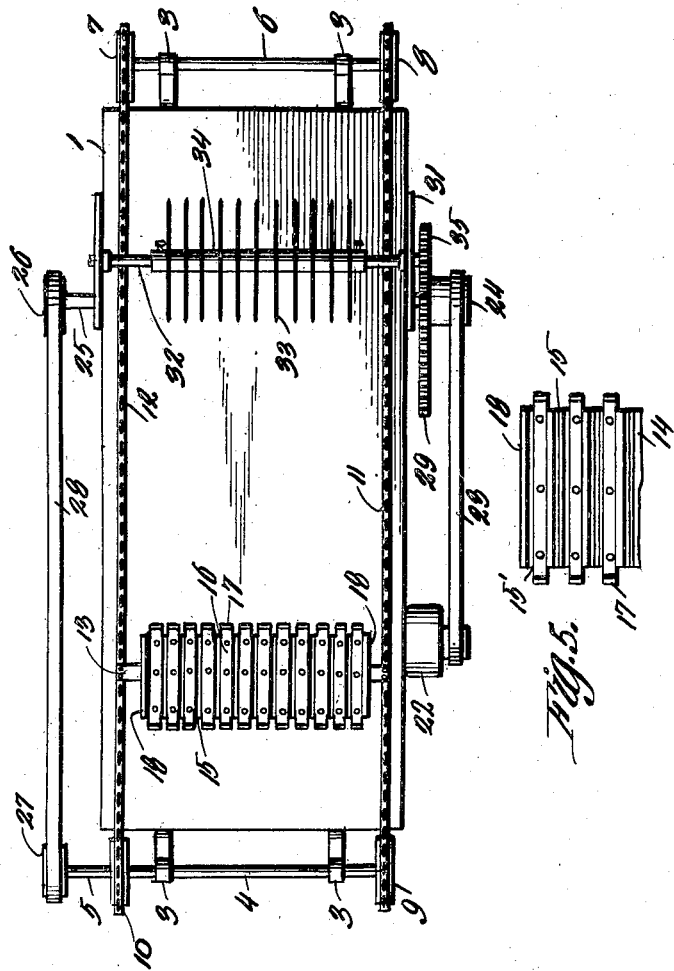
WITNESSES
Guy M. Spring
Frank D. O'Connell
JOHN M. AYALA
INVENTOR.
BY
Richard B. Owen
ATTORNEY.

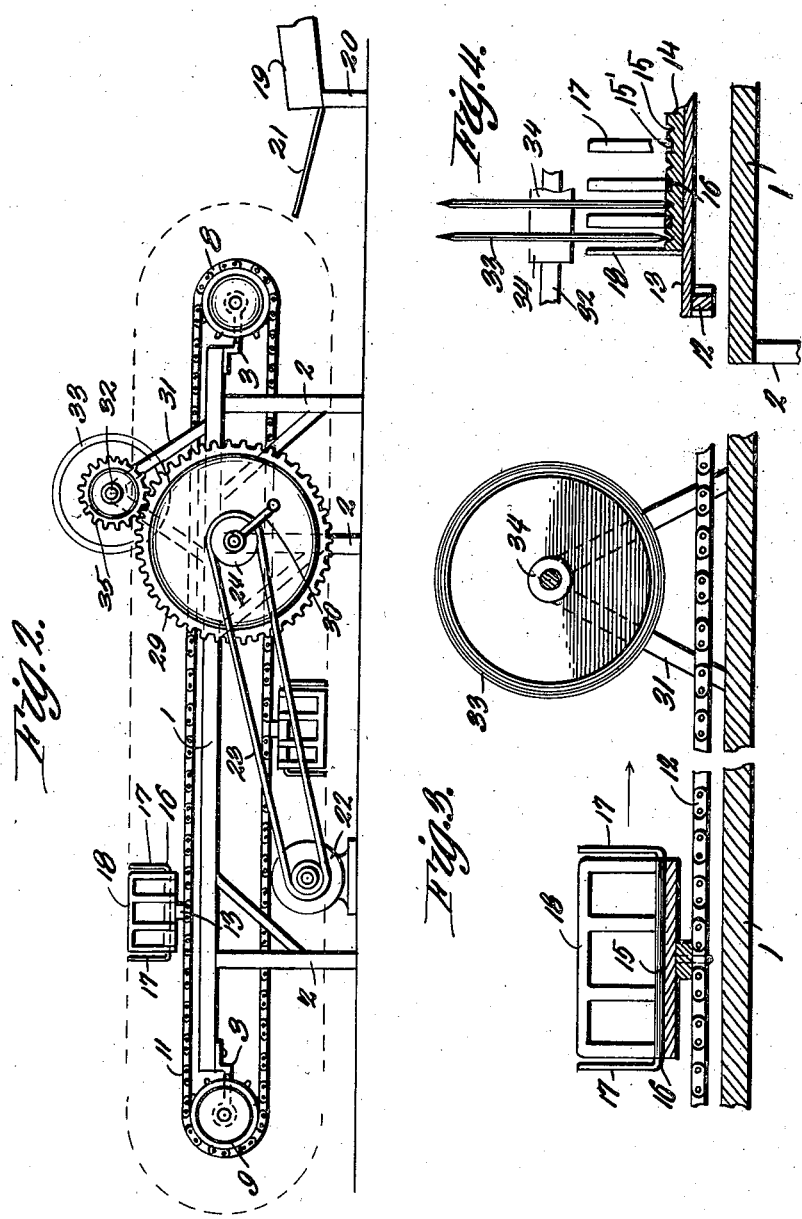

UNITED STATES PATENT OFFICE.

JOHN M. AYALA, OF HONOLULU, TERRITORY OF HAWAII.

BREAD-SLICING MACHINE.

1,418,511.      Specification of Letters Patent.      Patented June 6, 1922.

Application filed March 23, 1921. Serial No. 454,740.

*To all whom it may concern:*

Be it known that I, JOHN M. AYALA, a citizen of the United States, residing at Honolulu, in the Territory of Hawaii, have invented certain new and useful Improvements in Bread-Slicing Machines, of which the following is a specification.

The purpose of the present invention is to provide mechanical means whereby the cutting of bread loaves into slices may be conveniently and simply accomplished.

Another object is to provide a bread slicing machine of the character inferred, particularly adapted for the slicing of large quantities of bread and capable of being operated manually or from some other given source of power.

An additional object is to provide a slicing machine in which a plurality of rotary cutter elements slice the bread as each loaf is successively brought into engagement with the slicing means; the discharge of the slices into a suitable hopper being effected as the bread-carriers pass rearwardly of the cutters.

With the above and other objects in view, the invention may be said to reside generally in the details of construction, combination and arrangement of parts as will be hereinafter more fully pointed out and described, reference being had to the accompanying drawings, wherein Figure 1 is a top plan view of the machine, Figure 2, a side elevation thereof, Figure 3, an enlarged detail view, in section, disclosing the relative arrangement of rotary cutter and bread-carrier, Figure 4, a detail view, in section, also of the slicing means and bread-carrier, showing, in this instance, the relative arrangement of the cutter unit and guide fingers of the bread-carrier, and Figure 5, a plan view in detail of a fragment of a bread-carrier showing the relative arrangement of guide fingers and knife grooves.

Corresponding and like parts are referred to in the following description and indicated in the several views of the drawings by like reference characters.

The machine is mounted upon a table or work stand, comprising a top 1 and supporting legs 2. Secured to the stand, and projecting outwardly from adjacent, opposite ends, are a pair of shaft brackets 3. The brackets located at what may be termed the front or feeding end of the machine support a shaft 4, which extends transversely beyond one side of the stand, as indicated at 5. The brackets at the opposite end of the table support a shaft 6, upon each end of which is mounted a chain sprocket as indicated at 7 and 8. Corresponding sprockets 9 and 10 are likewise mounted upon shaft 4, sprockets 8 and 9 serving to support an endless chain 11, while sprockets 7 and 10 support chain 12. It is to be noted that the chain sprockets are so supported by their respective bearing brackets that they project above and below the plane of table top 1 and hence support the chains with their upper runs slightly elevated above and thus out of contact with the top of the table. Each chain is, of course, looped about the table longitudinally, as shown to advantage in Figures 1 and 2 of the drawings, and travels in an endless path during the operation of the machine. The chains serve as supports for the bread-carriers of which there may be as many as desirable.

The bread-carrier comprises a cross-strip or base-bar 13 adapted to bridge the space between chains 11 and 12, extending transversely of the table top, as shown to advantage in Figure 1, and having its ends respectively connected to the chains, as illustrated. Disposed longitudinally of cross-bar 13 to which it is fastened, and extending laterally therebeyond, is a bottom plate 14. This plate is provided with a plurality of alternating square and V-shaped grooves disposed cross-wise thereof in laterally spaced relation to each other. The V-shaped grooves provide knife grooves 15 for penetration by the cutting edge of a slicing unit while the square grooves provide recesses or sockets 15' for U-shaped elements 16. When the U-shaped elements are bolted or otherwise fastened in place, the vertically extending portions thereof provide fingers 17 more or less resilient, which not only serve to retain a bread loaf within the carrier but also tend to engage and brace the loaf so as to hold it firm and against crumbling, while being sliced. Being disposed on opposite sides of the knife groove, the fingers 17 also serve as guides for the cutter units of the slicing machine, as will be hereinafter explained. Bolted or otherwise fastened to the ends of plate 14, are end frames 18, which serve to hold the bread loaf within the carrier and against any endwise movement. The bread-carriers may be of any desired size and shape to correspond with the necessities and requirements depending upon the use of the machine. Adjacent the discharge end of the table is arranged a bread hopper or receiving member comprising a stand 19 supported upon legs 20 and provided with a forwardly projecting and inclined bread slide 21, having its outer end terminating just short of the line along which the outermost portions of the bread-carriers travel as they pass around the table, as indicated by the dotted lines. As each bread-carrier passes from the receiving end to the discharge end of the table, the slices are dislodged from the carrier by the downward sweep of the latter and fall upon slide 21 whence they are guided into hopper 19.

The actuation of the traveling bread-carriers may be accomplished either by hand or from some source of power, such as an electric motor 22. The motor is preferably connected by means of a drive belt 23 to belt pulley 24, mounted adjacent one end of drive shaft 25 which extends transversely of table 1, with its opposite ends projecting outwardly therebeyond and provided with belt pulley 26. A similar belt pulley 27 is provided on the extension 5 of shaft 4, and both pulleys are relatively connected by means of a drive belt 28. Belt pulley 24 is preferably carried by a large toothed gear 29, mounted on the drive shaft and movable therewith. As shaft 25 is rotated, it will be seen that the movement is transmitted by reason of belt pulleys 26 and 27 and belt 28 to chain shafts 4 and 6, and consequently to the movable carriers. For manually rotating the drive shaft, in the absence of the motor, a crank handle 30 is provided on one end of the shaft.

The bread slicing means is embodied in a pair of brackets 31 extending upwardly above the surface of the table on opposite sides and adjacent the discharge end, to provide bearings for horizontal shaft 32 disposed crosswise of the table and slightly above the line of travel of the bread-carriers. Loosely mounted upon the shaft are a plurality of cutter units 33, preferably in the nature of rotary knives or discs. As many of these cutters are arranged upon shaft 22 as there are knife grooves 15 provided in the base-plate of a bread-carrier. Spacer elements 34 are provided between each pair of cutter units to hold them in relatively spaced relation, so that they may readily pass between the guide fingers 17 of the bread-carriers as the latter are moved in opposition to the cutting means. The spacer element at the end of the cutter group is provided with a set screw or other fastening means for locking it rigidly to the shaft after the cutter units have been grouped together as desired and properly positioned with respect to the knife groove and slots or spaces between the fingers of the bread-carriers. It is to be noted that the vertically extending fingers of the bread-carriers define the knife-slots through which the cutter units pass as the carriers and cutting means move across each other. All of the spacer elements 34 are to be of the same size and shape in order that the cutter units may be equally spaced for cutting the bread into slices of comparatively the same size. It is also obvious that by providing spacer elements of variable sizes and using bread-carriers of corresponding construction that the slicing operation of the machine may be varied from time to time to cut slices of greater or lesser size.

In the operation of the machine, the bread loaves are placed in the bread-carriers at the receiving end of the table and are carried forwardly toward the cutting means as the machine is kept in operation. As each carrier comes into contact with the cutting means, the spaces or slots between the upstanding guide fingers 16 enable the rotating cutters to come in contact with the loaf while the knife grooves 16 receive the cutting edge of the rotating cutter and hold it firm and steady while the carriage is passing through the cutting means. Consequently, as the loaf is forced through the cutting means, it is cut into slices of even and uniform size. These slices are subsequently discharged from the carriers, and fall upon the bread slide 21, as each carrier in turn, descends at the discharge end of the table for its return trip, in an inverted position, beneath the table, as shown to advantage in Figure 2. The rotation of the cutter units is effected by means of a small cog-gear 35 having engagement with the large drive-gear 29 of the main drive shaft. Gear 35 is smaller in diameter than drive gear 29, so that the unit of the cutting means will be rotated at a rate much faster than that at which the traveling bread-carriers move.

The foregoing description and accompanying drawings have reference to what might be considered to be the approved or preferred form of my invention. I desire it to be understood that I may make such changes in the construction, combination and arrangement of parts, materials, dimensions, et cetera, as may prove expedient and fall within the scope of the appended claims.

Having thus described my invention, what I claim as new and desire to secure by Letters Patent is:—

1. A bread slicing machine comprising a plurality of bread-carriers arranged to travel in an endless path, and automatically discharging at a given point in said path, each of said bread carriers consisting of a base member and a series of spaced U-shaped members having their central portions extending across and secured to the base member and their ends projecting upwardly from the front and rear of said base member, and means disposed in the path of the traveling carriers for penetrating the same and slicing the contents thereof, and means at the discharge point for receiving the sliced contents of the carrier.

2. A bread slicing machine including stationary slicing means and a bread-carrier movable in opposition to the slicing means and comprising a plurality of connected U-shaped elements spaced laterally from each other, said element being offset, with respect to the units of the slicing means, whereby the contents of the carrier may be brought into direct contact with the slicing means.

3. In a bread slicing machine, a bread carrier consisting of a base member in the form of a flat rectangular plate having spaced grooves extending from front to back thereof, and a series of bars having their central portions carried in said grooves and fixed to said base member, the ends of said bars extending upwardly at the front and back of the base member to form front and rear rows of parallel fingers, said base member further having shallow knife edge receiving grooves disposed between the first mentioned grooves in parallelism thereto.

In testimony whereof I affix my signature in presence of two witnesses.

JOHN M. AYALA.

Witnesses:
  F. SCHNACK,
  G. M. TAIT.